US009166881B1

(12) United States Patent
Gray et al.

(10) Patent No.: US 9,166,881 B1
(45) Date of Patent: Oct. 20, 2015

(54) METHODS AND APPARATUS FOR ADAPTIVE BANDWIDTH-BASED COMMUNICATION MANAGEMENT

(71) Applicant: CONTACT SOLUTIONS LLC, Reston, VA (US)

(72) Inventors: Joshua Gray, Reston, VA (US); Michael Hibbard, Clear Brook, VA (US)

(73) Assignee: CONTACT SOLUTIONS LLC, Reston, VA (US)

( * ) Notice: Subject to any disclaimer, the term of this patent is extended or adjusted under 35 U.S.C. 154(b) by 0 days.

(21) Appl. No.: 14/587,558

(22) Filed: Dec. 31, 2014

(51) Int. Cl.
G06F 15/173 (2006.01)
H04L 12/24 (2006.01)
H04L 12/26 (2006.01)

(52) U.S. Cl.
CPC ........ *H04L 41/0816* (2013.01); *H04L 43/0876* (2013.01)

(58) Field of Classification Search
CPC ................ H04L 41/0816; H04L 43/0876
USPC ......................... 709/217, 219, 223
See application file for complete search history.

(56) References Cited

U.S. PATENT DOCUMENTS

| 4,797,925 | A | 1/1989 | Lin |
| 5,493,608 | A | 2/1996 | O'Sullivan |
| 5,553,121 | A | 9/1996 | Martin et al. |
| 5,562,453 | A | 10/1996 | Wen |
| 5,600,776 | A | 2/1997 | Johnson et al. |
| 5,615,257 | A | 3/1997 | Pezzullo et al. |
| 5,870,709 | A | 2/1999 | Bernstein |
| 5,874,962 | A | 2/1999 | De Judicibus et al. |
| 6,035,018 | A | 3/2000 | Kaufman |
| 6,069,939 | A | 5/2000 | Fung et al. |
| 6,146,147 | A | 11/2000 | Wasowicz |
| 6,226,364 | B1 | 5/2001 | O'Neil |
| 6,401,075 | B1 | 6/2002 | Mason et al. |
| 6,459,776 | B1 | 10/2002 | Aktas et al. |

(Continued)

FOREIGN PATENT DOCUMENTS

WO    WO 2013/057315 A2    4/2013
WO    WO 2013/163169 A1    10/2013

OTHER PUBLICATIONS

[Author Unknown] "Optimizing Adaptive Server Anywhere Performance Over a WAN", *iAnywhere Solutions, Inc., a subsidiary of Sybase, Inc.*, 9 pages (2005).
Abdelzaher and Bhatti et al., "Web Server QoS Management by Adaptive Content Delivery", *Internet Systems and Applications Laboratory, Hewlett Packard Laboratories*, Palo Alto, HPL-1999-161, 11 pages (1999).

(Continued)

*Primary Examiner* — Mohamed Wasel
(74) *Attorney, Agent, or Firm* — Cooley LLP

(57) ABSTRACT

An apparatus, includes a user interface module configured to send a signal to display an interface of a self-service application used by a user to communicate with a host device via a network. The apparatus also includes a bandwidth analysis module operatively coupled to the user interface module. The bandwidth analysis module is configured to calculate a bandwidth associated with communication with the host device via the network. The bandwidth analysis module is also configured to receive, from the host device, a bandwidth criterion associated with at least one network communication mode used for communication with the host device. The user interface module is configured to reduce or eliminate an availability of the at least one network communication mode to the self-service application when the bandwidth fails to meet the bandwidth criterion.

18 Claims, 6 Drawing Sheets

(56) References Cited

U.S. PATENT DOCUMENTS

| | | | |
|---|---|---|---|
| 6,462,759 B1 | 10/2002 | Kurtzberg et al. |
| 6,487,277 B2 | 11/2002 | Beyda et al. |
| 6,496,692 B1 | 12/2002 | Shanahan |
| 6,856,333 B2 | 2/2005 | Ullmann et al. |
| 6,981,242 B2 | 12/2005 | Lehmeier et al. |
| 6,985,865 B1 | 1/2006 | Packingham et al. |
| 7,024,366 B1 | 4/2006 | Deyoe et al. |
| 7,039,168 B1 | 5/2006 | Potts |
| 7,065,188 B1 | 6/2006 | Mei et al. |
| 7,089,592 B2 | 8/2006 | Adjaoute |
| 7,143,029 B2 | 11/2006 | Elshafei |
| 7,146,419 B1 | 12/2006 | O'Rourke et al. |
| 7,194,409 B2 | 3/2007 | Balentine et al. |
| 7,221,933 B2 | 5/2007 | Sauer et al. |
| 7,224,790 B1 | 5/2007 | Bushey et al. |
| 7,325,037 B2 | 1/2008 | Lawson |
| 7,385,997 B2 | 6/2008 | Gorti et al. |
| 7,415,100 B2 | 8/2008 | Cooper et al. |
| 7,447,662 B2 | 11/2008 | Gibson |
| 7,457,395 B2 | 11/2008 | Creamer et al. |
| 7,498,860 B2 | 3/2009 | Bhattacharya |
| 7,515,695 B1 | 4/2009 | Chan et al. |
| 7,519,049 B2 | 4/2009 | Masuda |
| 7,525,970 B2 | 4/2009 | Mangin et al. |
| 7,573,986 B2 | 8/2009 | Balentine et al. |
| 7,610,040 B2 | 10/2009 | Cantini et al. |
| 7,620,894 B1 | 11/2009 | Kahn |
| 7,653,543 B1 | 1/2010 | Blair et al. |
| 7,665,024 B1 | 2/2010 | Kondziela |
| 7,665,140 B2 | 2/2010 | Oliver et al. |
| 7,680,035 B2 | 3/2010 | Krishnan |
| 7,729,915 B2 | 6/2010 | Balentine et al. |
| 7,787,543 B2 | 8/2010 | Yamaguchi |
| 7,801,284 B1 | 9/2010 | Chakra et al. |
| 7,808,918 B2 | 10/2010 | Bugenhagen |
| 7,809,569 B2 | 10/2010 | Attwater et al. |
| 7,817,784 B2 | 10/2010 | Wang et al. |
| 7,836,409 B2 | 11/2010 | Denoue et al. |
| 7,865,841 B2 | 1/2011 | Morikawa |
| 7,903,792 B2 | 3/2011 | Balentine et al. |
| 7,904,387 B2 | 3/2011 | Geering |
| 7,920,682 B2 | 4/2011 | Byrne et al. |
| 7,970,615 B2 | 6/2011 | Attwater et al. |
| 8,000,689 B2 | 8/2011 | Featherstone et al. |
| 8,027,255 B2 | 9/2011 | Kahn et al. |
| 8,046,420 B2 | 10/2011 | Pan |
| 8,068,609 B2 | 11/2011 | Puranik et al. |
| 8,090,867 B2 | 1/2012 | Katis et al. |
| 8,094,788 B1 | 1/2012 | Eberle et al. |
| 8,096,657 B2 | 1/2012 | Pompilio et al. |
| 8,107,999 B2 | 1/2012 | Pandruvada |
| 8,108,509 B2 | 1/2012 | Chatani |
| 8,131,553 B2 | 3/2012 | Attwater et al. |
| 8,131,615 B2 | 3/2012 | Diev et al. |
| 8,145,562 B2 | 3/2012 | Wasserblat et al. |
| 8,155,948 B2 | 4/2012 | Ruano et al. |
| 8,171,123 B2 | 5/2012 | Takeda et al. |
| 8,190,554 B2 | 5/2012 | Chen et al. |
| 8,213,579 B2 | 7/2012 | Balentine et al. |
| 8,223,945 B2 | 7/2012 | Drovdahl et al. |
| 8,233,613 B1 | 7/2012 | Michaelis et al. |
| 8,254,552 B2 | 8/2012 | Harton et al. |
| 8,280,833 B2 | 10/2012 | Miltonberger |
| 8,370,497 B2 * | 2/2013 | Quittek et al. ............ 709/227 |
| 8,370,520 B2 | 2/2013 | Kohli et al. |
| 8,400,491 B1 | 3/2013 | Panpaliya et al. |
| 8,458,090 B1 | 6/2013 | Batra et al. |
| 8,495,244 B2 | 7/2013 | Bonar et al. |
| 8,595,218 B2 | 11/2013 | Bell et al. |
| 8,619,602 B2 | 12/2013 | Begen |
| 8,635,345 B2 | 1/2014 | Brown et al. |
| 8,880,631 B2 | 11/2014 | Logan et al. |
| 2002/0080938 A1 | 6/2002 | Alexander, III et al. |
| 2002/0090062 A1 | 7/2002 | Mohamed Alhadad et al. |
| 2002/0116466 A1 | 8/2002 | Trevithick et al. |
| 2002/0124258 A1 | 9/2002 | Fritsch |
| 2003/0031185 A1 * | 2/2003 | Kikuchi et al. ............ 370/400 |
| 2003/0064716 A1 | 4/2003 | Gailey et al. |
| 2003/0191639 A1 | 10/2003 | Mazza |
| 2004/0045036 A1 | 3/2004 | Terasaki |
| 2004/0258223 A1 | 12/2004 | Rahamim |
| 2005/0047556 A1 | 3/2005 | Somerville et al. |
| 2005/0058149 A1 | 3/2005 | Howe |
| 2005/0100022 A1 | 5/2005 | Ramprashad |
| 2006/0034287 A1 | 2/2006 | Novack et al. |
| 2006/0036442 A1 | 2/2006 | Novack et al. |
| 2006/0126803 A1 | 6/2006 | Patel et al. |
| 2006/0245357 A1 * | 11/2006 | Ilan ............ 370/235 |
| 2006/0271367 A1 | 11/2006 | Hirabayashi et al. |
| 2007/0036323 A1 | 2/2007 | Travis |
| 2007/0038705 A1 | 2/2007 | Chickering et al. |
| 2007/0053346 A1 | 3/2007 | Bettis et al. |
| 2007/0119923 A1 | 5/2007 | Garrison et al. |
| 2007/0250318 A1 | 10/2007 | Waserblat et al. |
| 2008/0004881 A1 | 1/2008 | Attwater et al. |
| 2008/0123627 A1 | 5/2008 | Moreman et al. |
| 2008/0216172 A1 | 9/2008 | Forman et al. |
| 2009/0327422 A1 | 12/2009 | Katis et al. |
| 2010/0002692 A1 | 1/2010 | Bims |
| 2010/0121974 A1 | 5/2010 | Einarsson et al. |
| 2010/0166158 A1 | 7/2010 | Costello et al. |
| 2010/0293090 A1 | 11/2010 | Domenikos et al. |
| 2010/0310059 A1 | 12/2010 | Davis et al. |
| 2011/0159854 A1 | 6/2011 | Kedefors et al. |
| 2011/0164744 A1 | 7/2011 | Olshansky et al. |
| 2011/0282778 A1 | 11/2011 | Wright et al. |
| 2012/0209630 A1 | 8/2012 | Ihm et al. |
| 2012/0253805 A1 | 10/2012 | Rajakumar et al. |
| 2012/0310652 A1 | 12/2012 | O'Sullivan |
| 2013/0018795 A1 | 1/2013 | Kolhatkar et al. |
| 2013/0058248 A1 * | 3/2013 | Singh et al. ............ 370/252 |
| 2013/0069858 A1 | 3/2013 | O'Sullivan |
| 2013/0070910 A1 | 3/2013 | O'Sullivan |
| 2013/0070911 A1 | 3/2013 | O'Sullivan |
| 2013/0079055 A1 * | 3/2013 | Jouin ............ 455/552.1 |
| 2013/0183979 A1 * | 7/2013 | Chen et al. ............ 455/436 |
| 2013/0185802 A1 | 7/2013 | Tibeica et al. |
| 2013/0204755 A1 | 8/2013 | Zoldi et al. |
| 2013/0263167 A1 | 10/2013 | Parthasarathy et al. |
| 2013/0282844 A1 | 10/2013 | Logan et al. |
| 2013/0332620 A1 | 12/2013 | Gahm et al. |
| 2014/0045456 A1 | 2/2014 | Ballai et al. |
| 2014/0137200 A1 | 5/2014 | Logan et al. |
| 2014/0140213 A1 * | 5/2014 | Raleigh et al. ............ 370/235 |
| 2014/0237061 A1 | 8/2014 | Logan et al. |

OTHER PUBLICATIONS

Balentine, B., "Its Better to Be a Good Machine Than a Bad Person: Speech Recognition and Other exotic User Interfaces at the Twilight of the Jetsonian Age," *ICMI Press*, Feb. 1, 2007, 115 pages.

International Search Report and Written Opinion for PCT Application No. PCT/US2013/37779, mailed Jul. 5, 2013, 8 pages.

International Preliminary Report on Patentability for International Application No. PCT/US2013/37779, dated Oct. 28, 2014, 7 pages.

Stemm and Katz, "A Network Measurement Architecture for Adaptive Applications", *INFOCOM, Nineteenth Annual Joint Conference of the IEEE Computer and Communications Societies, Proceedings, IEEE*, 1:285-294, 10 pages (2000).

Wei et al., "Effective detection of sophisticated online banking fraud on extremely imbalanced data", *World Wide Web, Internet and Web Information Systems*, 16(4):449-475, 29 pages (2013).

Zhang, Dongsong, "Delivery of Personalized and Adaptive Content to Mobile Devices: A Framework and Enabling Technology", *Communications of the Association for Information Systems*, 12(13):183-202, 22 pages (2003).

Office Action for U.S. Appl. No. 14/616,037, mailed May 11, 2015, 21 pages.

\* cited by examiner

METHODS AND APPARATUS FOR ADAPTIVE BANDWIDTH-BASED COMMUNICATION MANAGEMENT

BACKGROUND

Some known self-service systems (e.g., interactive voice response (IVR) systems, online websites, real-time online chat systems, mobile applications, web-based applications, etc.) are used to service routine customer queries and/or transactions, such as, for example, servicing credit cards, account payments, and/or the like. Self-service systems can be deployed over data networks, such as (but not limited to) dial-up access networks, broadband networks, mobile data networks, and/or the like. However, network connection strength, availability, and/or quality can vary, especially when individuals are interacting with the self-service network while in motion (e.g., via a mobile phone-based application while moving). The interaction between a user's device and the self-service system can be impeded, interrupted, and/or otherwise negatively affected by the varying network performance, thereby affecting the quality of service received by the user.

Thus, a need exists for detecting changes in network/connection parameters in substantially real-time, such as strength and/or bandwidth, and adapting communication between the system and the user's device for improving quality of service received by the user.

SUMMARY

An apparatus, includes a user interface module configured to send a signal to display an interface of a self-service application used by a user to communicate with a host device via a network. The apparatus also includes a bandwidth analysis module operatively coupled to the user interface module. The bandwidth analysis module is configured to calculate a bandwidth associated with communication with the host device via the network. The bandwidth analysis module is also configured to receive, from the host device, a bandwidth criterion associated with at least one network communication mode used for communication with the host device. The user interface module is configured to reduce or eliminate an availability of the at least one network communication mode to the self-service application when the bandwidth fails to meet the bandwidth criterion.

DETAILED DESCRIPTION

Figure 1:
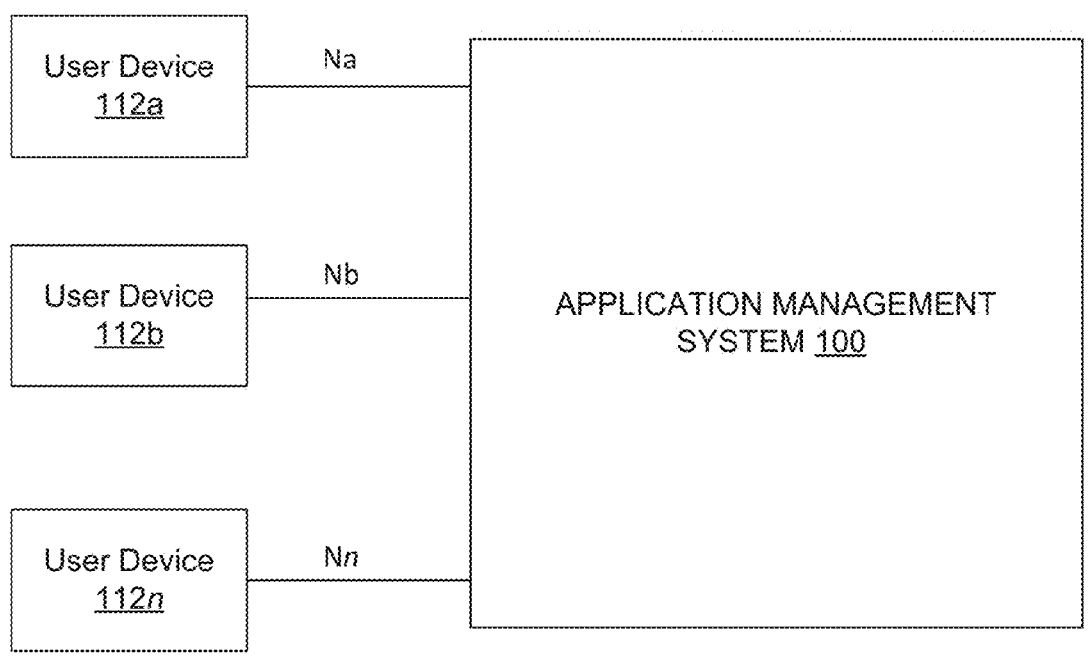
FIG. 1 is an illustration of interaction between user devices and an application management system, according to an embodiment.

Apparatus and methods for adaptive bandwidth-based communication management are described herein. Some embodiments are directed to evaluating network performance during an interaction between a user/user device and a host device connected via a network, and modifying the user's experience based on the network performance.

In some instances, the user device can be, for example, a smartphone running a cloud-based, self-service application employed by a user for interacting with a call management/self-service system on the host device. The user device or the host device, or both, can, for example, determine one or more of network strength, bandwidth or any suitable indicator of the quality and/or quantity thereof (e.g., a network strength score, a bandwidth score, and/or the like) in concert with the other. For example, the user device can transmit a request to the host device to test network strength and/or bandwidth. In response, the host device can respond with standard data, such as, for example, a standard data payload. Since the user device can track the time it takes to receive the standard data, the user device can then determine network strength and/or bandwidth. Unless explicitly stated otherwise, it is understood that the term "network strength" can encompass any aspect of network performance including, but not limited to, latency, upload speed, download speed, reliability, the rate of change of any of these, and/or the like.

In some embodiments, a self-service application can include an interactive voice response (IVR) system, an online website, a real-time online chat system, a call center system, and/or the like. In some embodiments, self-service applications can be used to provide information to users (e.g., a bank account balance, operating hours of a store, etc.), to provide customer service to users, and/or any other suitable service to a user.

In some instances, the user device can also transmit a request to the host device for network strength and/or bandwidth threshold settings. The host device can respond with this information. In this manner, the host device can manage signal strength and bandwidth threshold settings for client devices, which in turn inform the client device(s) on how to modify the user's experience of interacting with the self-service application. The strength and/or bandwidth threshold settings can be updated, for example, by a user/administrator of the host device.

In some instances, the client device can request the host device to provide data and/or content that is modified based on the calculated network strength and/or bandwidth as well as the current strength and/or bandwidth threshold settings. The host device can be configured to modify the data sent to the client device. For example, the data transmitted to the client device can be adapted to vary and/or limit a number of account history records, a number of customer service request history records, a number of past messages in a conversation (e.g., between the user of the client device and an automated/human representative associated with the host device), a format of multimedia content (e.g., the extent and nature of data compression employed), a number of knowledge-based articles provided to the client device, and/or the like.

In some instances, the client device can also vary the data, options, features, and/or the like provided to the user of the client device based on the calculated network strength and/or bandwidth as well as the current strength and/or bandwidth threshold setting. For example, in a self-service application, the client device can adapt the user experience by varying substantially real-time multimedia chat capabilities (e.g., voice only, voice and video, etc.), modalities offered to users (e.g., image messages, voice messages, video messages, and combinations thereof), a frequency of automatic data updates, and/or the like.

As used herein, a module can be, for example, any assembly and/or set of operatively-coupled electrical components associated with performing a specific function(s), and can include, for example, a memory, a processor, electrical traces, optical connectors, software (that is stored in memory and/or executing in hardware) and/or the like.

As used in this specification, the singular forms "a," "an" and "the" include plural referents unless the context clearly dictates otherwise. Thus, for example, the term "a module" is intended to mean a single module or a combination of modules.

FIG. 1 is a schematic illustration of an environment within which embodiments disclosed herein can be implemented and employed, and illustrates an application management system 100 (hereon "system", or "host device"). The system 100 is operable for use by entities such as the user devices 112a-112n (generally, "user device(s)"). The system 100 can be a personal computer, a server, a work station, a tablet, a mobile device, a cloud computing environment (e.g., including one or more servers, processors, etc.), an application or a module running on any of these platforms, and/or the like. In some embodiments, the application management system 100 can execute at least a portion of a self-service application and/or system.

The user devices 112a-112n are associated with users of the system 100, although it is understood that, in some embodiments, the user devices 112a-112n can represent hardware/software interfaces (e.g., a compute device, a land or mobile phone, a web interface, a mobile phone interface, and/or the like) interacting with the system 100, and/or the like. For example, the user device 112a can encompass a mobile phone employed by a user/owner of the phone. In some embodiments, the user devices 112a-112n can execute at least a portion of a self-service application and/or system (e.g., in conjunction with application management system 100).

The system 100 can be in communication with the user devices 112a-112n as indicated by solid lines in FIG. 1 via, for example, one or more networks, each of which can be any type of network such as, for example, a local area network (LAN), a wide area network (WAN), a virtual network, a telecommunications network, a data network, and/or the Internet, implemented as a wired network and/or a wireless network. In some embodiments, any or all communications can be secured using any suitable type and/or method of secure communication (e.g., secure sockets layer (SSL)) and/or encryption. In other embodiments, any or all communications can be unsecured.

Each network connection of the system 100 with the user devices 112a-112n (collectively denoted by Na-Nn, respectively) can have certain connection parameters that characterizes the properties of the network connection between the system and the particular device. Such properties can include, but are not limited to, network signal strength, bandwidth, roundtrip transmission time, and/or the like. The connection parameters can be estimated and/or provided by the system 100, the particular user device itself, or by another device (not shown).

In some embodiments, aspects of the system 100 are operable to monitor how quickly and accurately a user is responding via an input device, such as generally disclosed in U.S. Patent Application Publication No. 2013/0069858 titled "ADAPTIVE COMMUNICATIONS SYSTEM", filed Aug. 26, 2005; and in U.S. Patent Application Publication No. 2013/0070910 titled "ADVANCED ADAPTIVE COMMUNICATIONS SYSTEM (ACS)", filed Jul. 10, 2008, the entire disclosures of which are incorporated herein by reference. In some embodiments, aspects of the system 100 are operable to adapt to the speaking accent of a user, such as generally disclosed in U.S. Patent Application Publication No. 2013/0070911 titled "ADAPTIVE ACCENT VOICE COMMUNICATIONS SYSTEM (AAVCS)", filed Aug. 26, 2005, the entire disclosure of which is incorporated herein by reference. In some embodiments, aspects of the system 100 are operable to automatically monitor and learn from normal in-use behavior exhibited by a human user, such as generally disclosed in U.S. Patent Application Publication No. US2012/0310652 titled "ADAPTIVE HUMAN COMPUTER INTERFACE (AAHCI)", filed Jun. 1, 2009, the entire disclosure of which is incorporated herein by reference. In some embodiments, aspects of the system 100 are operable to automatically adapt to suit the speed at which a user interacts with the system, such as generally disclosed in U.S. Pat. No. 5,493,608 titled "CALLER ADAPTIVE VOICE RESPONSE SYSTEM", filed Mar. 17, 1994, the entire disclosure of which is incorporated herein by reference. In some embodiments, aspects of the system 100 are operable for multi-mode asynchronous communication, such as generally disclosed in U.S. Patent Application Publication No. 2013/0282844 titled "APPARATUS AND METHODS FOR MULTI-MODE ASYNCHRONOUS COMMUNICATION", filed Mar. 12, 2013, the entire disclosure of which is incorporated herein by reference. In some embodiments, aspects of the system 100 are operable for communication flow modification, such as generally disclosed in U.S. Provisional Application No. 61/936,639 titled "SYSTEMS, APPARATUSES AND METHODS FOR COMMUNICATION FLOW MODIFICATION", filed Feb. 6, 2014, the entire disclosure of which is incorporated herein by reference.

Figure 2:
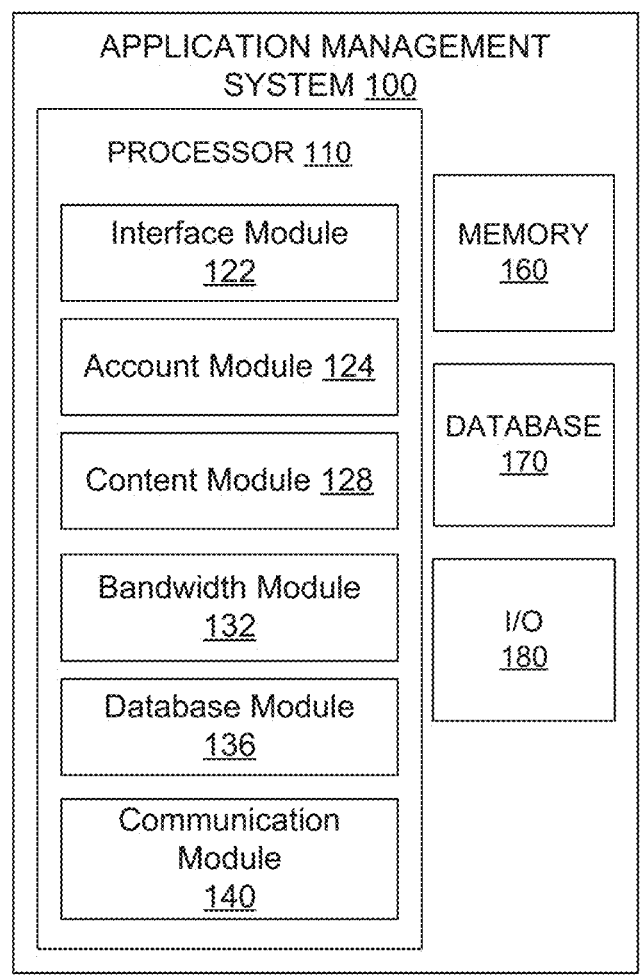
FIG. 2 is an illustration of an embodiment of the application management system of FIG. 1.

As illustrated in FIG. 2, the system 100 includes at least a processor 110 and a memory 160. FIG. 2 also illustrates a database 170, although it will be understood that, in some embodiments, the database 170 and the memory 160 can be a common data store. In some embodiments, the database 170 constitutes one or more databases. Further, in other embodiments (not shown), at least one database can be external to the system 100. FIG. 1 also illustrates an input/output (I/O) component 180, which can depict one or more input/output interfaces, implemented in software and/or hardware, for interacting with the user devices 112a-112n, and/or for other entities to interact directly or indirectly with the system 100.

The memory 160 and/or the database 170 can independently be, for example, a random access memory (RAM), a memory buffer, a hard drive, a database, an erasable programmable read-only memory (EPROM), an electrically erasable read-only memory (EEPROM), a read-only memory (ROM), Flash memory, and/or so forth. The memory 160 and/or the database 170 can store instructions to cause the processor 110 to execute modules, processes and/or functions associated with the system 100.

The processor 110 can be, for example, a general purpose processor, a Field Programmable Gate Array (FPGA), an Application Specific Integrated Circuit (ASIC), a Digital Signal Processor (DSP), and/or the like. The processor 110 can be configured to run and/or execute application processes and/or other modules, processes and/or functions associated with the system 100 and/or the network. The user devices 112a-112n also include a memory and a processor (see FIG. 4, explained in further detail herein).

The processor 110 includes an interface module 122, an account module 124, a content module 128, a bandwidth module 132, a database module 136, and a communication module 140. In some embodiments, the processor 110 can include additional modules (not shown). Each module can independently be a hardware module and/or a software module (implemented in hardware, such as the processor 110). In some embodiments, each of the modules 122, 124, 128, 132, 136 and 140 can be operatively coupled to each other.

In other embodiments, the functionality of one or more of the modules can be combined and/or overlap. For example, in other embodiments, the content module 128 and the database module 136 can be a single module. In some embodiments, the functionality of one or more modules and/or the interaction between the modules can be based on regulatory requirements for data processing, storage, integrity, security, and/or the like.

While shown as being implemented in processor 110, in other embodiments, the modules can be distributed. In such embodiments, for example, the interface module 122 can be at a first processor and/or a first network device and the account module can be at a different processor and/or a network device. Additionally, in some embodiments, at least a portion of the other modules can be distributed. Such processors and/or network devices can be communicatively coupled via, for example, a network.

The communication module 140 is configured to facilitate network connectivity for the system 100. For example, the communication module 140 can include and/or enable a network interface controller (NIC), wireless connection, a wired port, and/or the like. As such, the communication module 140 can establish and/or maintain a communication session with any of the user devices (e.g., via a network such as the Internet (not shown)). Similarly stated, the communication module 140 can enable the system 100 to send data to and/or receive data from the user devices 112a-112n.

The database module 136 is configured to interface with the memory 160 and/or the database 170 for data manipulation (including storage, modification, and/or deletion). For example, the database module 136 can store a bandwidth criterion in the memory 160 and/or the database 170. In another example, the database module 136 can update user preferences associated with a stored user profile in the memory 160 and/or the database 170.

The account module 124 is configured to communicate with the memory 160 and/or the database 170 (e.g., via the database module 136) to manage stored user and/or user device profile information. In some embodiments, the account module 124 can receive updated user profile information via the user devices 112a-112n, and can update the memory 160 and/or the database 170 (e.g. via the database module 136) with the updated information. In some embodiments, the user profile information can include communication mode preferences. For example, the profile information can include information indicating a minimum bandwidth at which the user prefers video communication, voice communication, text communication and/or the link. Similarly, the user profile information can include information indicating a minimum bandwidth at which the user would like to receive videos in the communication, images in the communication, formatted text in the communication, plan text in the communication, and/or the like. As such, the user can use the user profile to customize the user experience.

In some embodiments, the user device profile information can include features, services, and/or capability of the user device. In some embodiments, the user device profile can include name, description, modules, feature settings, services, service settings, and/or the like. In some embodiments, the user device profile can include network service capabilities for one or more content types (e.g., images, video, etc.). In some embodiments, the network service capabilities can include the capability of the user device to perform one or more of scaling, rendering or decoding content for one or more content types.

The bandwidth module 132 can calculate and/or determine one or more bandwidth criteria for a user device 112a-112n, such as bandwidth, a bandwidth score, a bandwidth threshold, and/or the like. In some embodiments, the bandwidth module 132 can calculate a bandwidth criterion based on a number of user devices 112a-112n currently accessing the system 100, a number of user devices 112a-112n expected to access the system 100, a profile of a user of the user device 112a-112n, a time of day, a day of week, and/or any other suitable parameters. The bandwidth module 132 can calculate a bandwidth criterion periodically, in response to receiving a request from a user device 112a-112n, in response to a change in one or more parameters used to calculate the bandwidth criterion, and/or the like. Such a bandwidth criterion can be dynamic and can change and/or be updated when one or more of the parameters used to calculate the bandwidth criterion changes. In some embodiments, the one or more parameters used to calculate the bandwidth criterion can include, but are not limited, to latency and/or reliability. In some embodiments, the bandwidth module 132 can calculate a bandwidth criterion based on network strength and/or bandwidth of a connection between the system 100 and one or more other devices and/or systems (not shown), such as, for example, a database external to the system 100. In this manner, the bandwidth module 132 can account for how service to the user device 112a can be affected based on network connections other than Na and/or other devices and/or systems accessed by the application management system 100.

The interface module 122 can interact with the user devices 112a-112n. In some embodiments, the interface module 122 can receive, from (for example) the user device 112a, a request for a bandwidth criterion. In this manner, the system 100 can operate as a source of bandwidth setting information for user devices interacting with the system. In some embodiments, the interface module 122 intermittently pushes a bandwidth criterion to one or more user devices 112a-112n, such as, for example, during a synchronization operation.

In some embodiments, the interface module 122 receives an updated bandwidth criterion after receiving the request for the bandwidth criterion, and then receives, from the user device 112a a second request for a bandwidth criterion. In such embodiments, the interface module 122 is configured to transmit, to the user device 112a and in response to the second request, the updated bandwidth criterion.

In some embodiments, the interface module 122 retrieves the bandwidth criterion for the requesting user device 112a. In some embodiments, the bandwidth criterion can be based on the device 112a (e.g., a device profile of the device 112a), based on a subset and/or grouping of the user devices 112a-112n to which the user device 112a belongs, a user profile, and/or the like. In some embodiments, the bandwidth criterion is based on the network/connection parameters of the connection Na. In some embodiments, the bandwidth criterion is provided at the system 100 by a user local to the system and/or via a device (not shown) remote to the system 100.

In some embodiments, the bandwidth criterion includes one or more bandwidth thresholds, and a modification of the user experience associated with crossing each threshold. For example, the bandwidth criterion specifies that when bandwidth of the connection Na is greater than a threshold, the user can employ video chat, and when the bandwidth falls below the same threshold, video chat is disabled for the user. In this manner, the system 100 can control requests for content made to the system by the user devices 112a-112n based on the bandwidth available to the user devices 112a-112n.

In some embodiments, the bandwidth criterion is stored in the memory 160 and/or the database 170 and is accessed by the interface module 122 directly, via the content module 128, or via the database module 136. In some embodiments, the bandwidth criterion is stored as associated with a user profile (e.g., of a user of the user device 112a), as associated with a user device profile of the device 112a, and/or the like.

The interface module 122 can transmit, in response to receiving the request for the bandwidth criterion, the bandwidth criterion to the user device 112a. The interface module 122 can receive from the user device 112a, after transmitting the bandwidth criterion, a request for content that includes an indication of content and an indication of a form of the content.

The content requested can be any data transmittable between the user devices 112a-112n and the system 100. In some embodiments, the content can include typical call service-related content such as, but not limited to, account history records, customer service request history records, past messages in a conversation, multimedia content, multimedia messages, knowledge base articles, and/or the like.

The indication of content can include any suitable specification for content such as, for example, a specific image, a specific video, a specific knowledge base article, and/or the like. The indication of a form of the content can include any suitable specification for the form of the content such as, for example: the resolution, size, and/or extent of compression of an image; the resolution, extent of compression (i.e., quality), and/or format of a video; decrease or restore information in a knowledge base article, such as textual information; and/or the like. In some embodiments, the indication of the form of the content can include a specification of modification/adaptation of the content such as, for example, scaling an image from 1024×1024 resolution to 640×640 resolution. In some embodiments, the indication of the form of the content includes a specification of no modification to be made to the content, that the content be provided in its native and/or default format, or is silent with respect to modification. As an example, if the request for content is for knowledge base articles and no modification is indicated, then a default number of knowledge base articles can be selected and provided.

The interface module 122 can transmit, to the user device 112a, in response to the request for content, content selected by the content module 128. The content module 128 can select content based on the indication of the content and the indication of the form of the content to define selected content. In some embodiments, based on the indication of the form of the content, the content module 128 can modify content to generate the selected content such as by, for example, changing the bitrate of an audio file from 256 kbps to 128 kbps. In some embodiments, the content module 128 stores the modified content for a limited time for future use such as, for example, when a subsequent request is received for the modified content. In some embodiments, the content and/or the modified content is stored in the memory 160 and/or the database 170 and is accessed directly by the content module 128, or via the database module 136.

In some embodiments, the request for content includes a request for knowledge base articles, and the content module 128 is configured to select, based on the indication of the content and the indication of the form of the content, a number of knowledge base articles to include in the selected content. A knowledge base article can include any information structured in a manner that it is usable by a computing device (such as any of the devices 112a-112n) and/or a user of a computing device to, for example, solve a problem. Information in a knowledge base is not structured in a flat data format (such as is the case in most relational databases), but is referential in nature, as can be accomplished by, for example, the use of pointers. In some embodiments, each knowledge base article can be represented using an object model. Knowledge base articles can include, for example, help desk agents, tutorials, frequently asked questions (FAQs), and/or the like. In some embodiments, the knowledge base article(s) are associated with self-service information.

In some embodiments, the content module 128 is configured to store each request for content in the memory 160 and/or the database 170 for use by the user device 112a at a later time. In some embodiments, the request for content includes a request for such content request history records, and the content module 128 is configured to select, based on the indication of the content and the indication of the form of the content, a number of representations of previous requests for content made by the user device 112a to include in the selected content.

In some embodiments, another request for content (second content) is received that does not include an indication of a form of the second content. In such embodiments, the content module 128 can select the default form of the requested content as the selected content, and the interface module 122 can transmit the second content in the default form in response to the request for second content. In some embodiments, the request for second content includes an indication of default second content and of a default form of the second content. In such embodiments, the content module 128 can select the default form of the requested content as the selected content and the interface module 122 can transmit the default second content in the default form of the second content in response to the request for second content.

Figure 3:
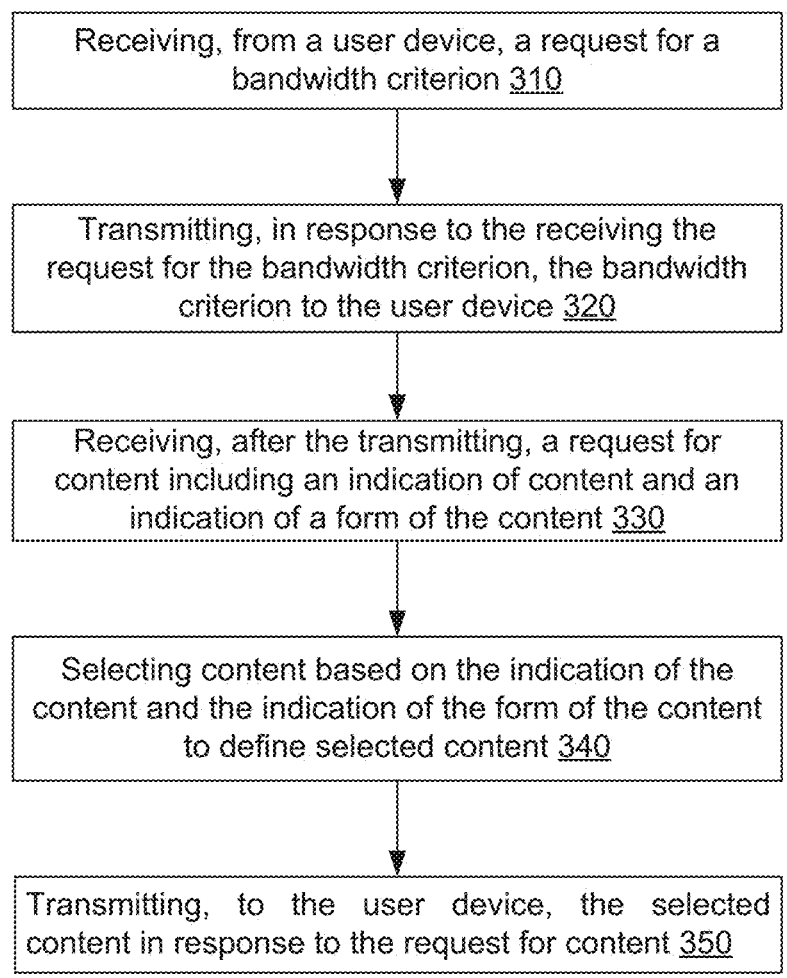
FIG. 3 is a flowchart of a method implemented by an application management system, according to an embodiment.

FIG. 3 illustrates a method 300, according to an embodiment. Explained with reference to the system 100, at 310, a request for a bandwidth criterion is received at a host device (e.g., the system 100) from a user device (e.g., any of the devices 112a-112n). At 320, the bandwidth criterion is transmitted to the user device in response to the received request for bandwidth criterion.

At 330, after transmitting the bandwidth criterion, a request for content is received. The request for content includes an indication of content and an indication of a form of the content. At 340, content is selected, such as by the content module 128, based on the indication of the content and the indication of the form of the content to define selected content. In some embodiments, the selecting step includes at least one of selecting a number of knowledge base articles to include in the selected content, or selecting a number of representations of previous requests for content made by the user device to include in the selected content. In some embodiments, the step 340 includes selecting a number of knowledge base articles to include in the selected content. The knowledge base articles can be associated with self-service information such as, for example, a tutorial or a help desk agent. In some embodiments, the step 340 can include selecting a number of representations of previous requests for content made by the user device to include in the selected content. In some embodiments, the step 340 includes reducing information, such as, for example, reducing textual information, in one or more knowledge base articles, and including the knowledge base article(s) with the reduced information in the selected content. At 350, the selected content is transmitted to the user device in response to the request for content.

In some embodiments, the request for bandwidth criterion is a first request from the user device, and the method 300 can further include receiving an updated bandwidth criterion after receiving the first request for the bandwidth criterion. In such embodiments, the method 300 can further include receiving a second request for a bandwidth criterion from the user device after receiving the updated bandwidth criterion, and transmitting, to the user device and in response to the receiving the second request, the updated bandwidth criterion.

In some embodiments, the request for content is a request for first content from the user device, and the method 300 can further include receiving a request for second content. In some embodiments, the request for second content does not include an indication of a form of the second content. In such embodiments, the method 300 can further include transmitting the second content in a default form in response to the request for second content. In other embodiments, the request for second content includes an indication of default second content and of a default form of the second content. In such embodiments, the method 300 can further include transmitting the default second content in the default form of the second content in response to the request for second content.

Figure 4:
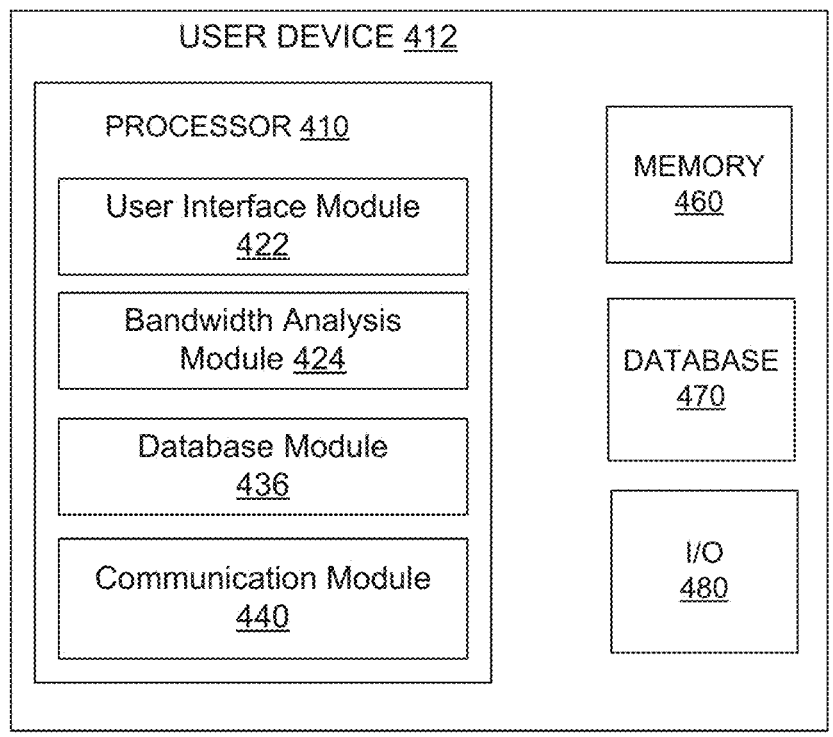
FIG. 4 is an illustration of an embodiment of the user devices of FIG. 1.

FIG. 4 illustrates a user device 412, which can be structurally and/or functionally representative of the user devices 112a-112n. In some embodiments, the user device 412 can be any computing device that can experience variable connectivity with the system 100, such as, for example, a smartphone, a tablet, a laptop computer, a desktop computer, and/or the like.

The user device 412 includes at least a processor 410 and a memory 460. Unless explicitly stated otherwise, it is understood that the various components of the user device 412 can be structurally and/or functionally similar to similarly named components of the system 100. For example, the I/O component 480 can be functionally similar to the I/O component 180, the database 470 can be internal/external to the user device 412 in a manner similar to the described relationship between the database 170 and the system 100, and so on.

The processor 410 includes a user interface module 422, a bandwidth analysis module 424, a database module 436, and a communication module 440. In some embodiments, the processor 110 can include additional modules (not shown). Each module can independently be a hardware module and/or a software module (implemented in hardware, such as the processor 410).

In some embodiments, the functionality of one or more of the modules can be combined and/or overlap. For example, the user interface module 422 and the bandwidth analysis module 424 can be a single module. In some embodiments, the user interface module 422 and the bandwidth analysis module 424 together can constitute an application running on the user device 412, and can encompass an embodiment in which the user interface module 422 and the bandwidth analysis module 424 are part of a cloud-based, self-service application and the user device 412 is a mobile computing device.

The communication module 440 can facilitate network connectivity for the device 412. For example, the communication module 440 can include and/or enable a network interface controller (NIC), wireless connection (e.g., a cellular connection, a Wi-Fi connection, etc.), a wired port, and/or the like. As such, the communication module 440 can establish and/or maintain a communication session with the system 100 (e.g., via a mobile data network such as can be provided by a telecommunication provider).

The database module 436 can interface with the memory 460 and/or the database 470 for data manipulation (including storage, modification, and/or deletion). For example, the database module 436 can store bandwidth criterion, content, and/or the like in the memory 460 and/or the database 470.

The bandwidth analysis module 424 can determine network parameters of the connection (e.g., the connection Na of FIG. 1) between the user device 412 and a system (e.g., system 100 of FIG. 1). As an example, the bandwidth analysis module 424 can conduct a bandwidth test of the connection (e.g., connection Na of FIG. 1) such as by downloading and/or uploading an amount of data (e.g., a maximum amount of data) in a predetermined period of time, or a predetermined amount of data to determine an amount of time to upload and/or download the predetermined amount of data. As another example, the bandwidth analysis module 424 can conduct a bandwidth test of the connection (e.g., connection Na of FIG. 1) by measuring latency, round-trip delay time, and/or bandwidth-delay product (product of the capacity of the connection and the round-trip delay time) for a standard amount of data from the device 412 to the system and back. In this manner, the bandwidth analysis module 424 is configured to calculate a bandwidth associated with communication with the host device via the network (e.g., the bandwidth of the connection Na with the system 100 of FIG. 1). The bandwidth analysis module 424 can calculate the bandwidth substantially continuously, periodically, sporadically, or on-demand.

The bandwidth analysis module 424 can receive a bandwidth criterion for the connection (e.g., connection Na of FIG. 1). In some embodiments, the bandwidth analysis module 424 is configured to transmit a request for the bandwidth criterion to a host device (e.g., the system 100), and is configured to receive the bandwidth criterion from the host device in response to the request for the bandwidth criterion.

The user interface module 422 is configured to provide a suitable interface to a user of the device 412, such as a visual display on a display screen (not shown) of the device 412, or associated therewith. In some embodiments, the interface can include audio and/or tactile aspects instead of or in addition to a visual aspect. In some embodiments, the interface is for a self-service application and provides varied communication modes/modalities for a user to interact with the system, such as images, text, voice, video, and/or the like. In some embodiments, the communication modes can include one or more communication channels between the device 412 and the system, such as for voice, text, and/or video-based communications. A communication channel can be any connection and/or session that provides for communication between two devices (e.g., the user device 112a and the system 100). In some embodiments, the user interface module 422 is configured to send a signal to display an interface of a self-service application used by a user to communicate with a host device (e.g., the system 100) via a network, such as via the network connection Na of FIG. 1.

The user interface module 422 is further configured to alter or modify the interface of the self-service application, the available communication modes and/or the available communication modes, based on the calculated bandwidth, the bandwidth criterion, a user profile, and/or the like. For example, if the bandwidth criterion specifies a minimum bandwidth for permitting the user to employ video-based communications, the self-service application can enable a video communication feature when the bandwidth is greater than the minimum bandwidth for video. The self-service application can also disable the video communication feature when the bandwidth falls below the minimum bandwidth. As another example, the self-service application can permit the user to communicate using voice and/or text but not video when the bandwidth falls below the minimum bandwidth video. For another example, the bandwidth criterion can specify a minimum bandwidth for permitting the user to use voice-based communication. If the bandwidth falls below the minimum threshold for voice, the user can communication using text, but not video or voice. For yet another example, the user profile may be used to store a user preference regarding when (e.g., at what time, at what bandwidth, etc.) to use video communication, voice communication, text communication, and/or the like. The comparison of the calculated bandwidth to the bandwidth criterion can be performed by the user interface module 422 and/or the bandwidth analysis module 424. In this manner, the user interface module 422 is configured to reduce or eliminate an availability of the at least one network communication mode to the self-service application when the bandwidth fails to meet the bandwidth criterion.

In some embodiments, the user interface module 422 is configured to modify the interface of the self-service application by reducing or eliminating availability of one or more knowledge base articles to the self-service application when the bandwidth fails to meet the bandwidth criterion. For example, a video tutorial may not be provided to a user if the bandwidth does not meet a bandwidth criterion associated with the video tutorial. In such an example, a text-based tutorial may instead be provided. For another example, still images may be used in a communication rather than video if the bandwidth does not meet a bandwidth criterion associated with the video. In some embodiments, the knowledge base articles are associated with self-service information provided to the user via the self-service application.

In some embodiments, the network communication mode includes at least one of images, text, voice, or video. In some embodiments, the communication mode includes at least one of a voice communication channel, a video communication channel, a text communication channel, and/or the like.

During use, in some embodiments, the user interface module 422 is configured to receive a request from the user via the self-service application, such as for content residing on the system (e.g., system 100 of FIG. 1). In some embodiments, the bandwidth analysis module 424 is further configured to select, based on (1) the request from the user, (2) the bandwidth criterion (e.g., one or more bandwidth thresholds), and (3) the bandwidth, the content and the form of the content to be requested from the host device to define selected content. The bandwidth analysis module 424 is further configured to send a request for the selected content to the host device. The request for the selected content includes an indication of the content and an indication of the form of the content (e.g., a video tutorial having a particular format and resolution). The bandwidth analysis module 424 is further configured receive the selected content from the host device in response to the request for the selected content. The user interface module 422 can present the selected content to the user in response to the request for content. In this manner, the device 412 can account for network performance in requesting content from the system 100, and modify the request for content accordingly.

Figure 5:
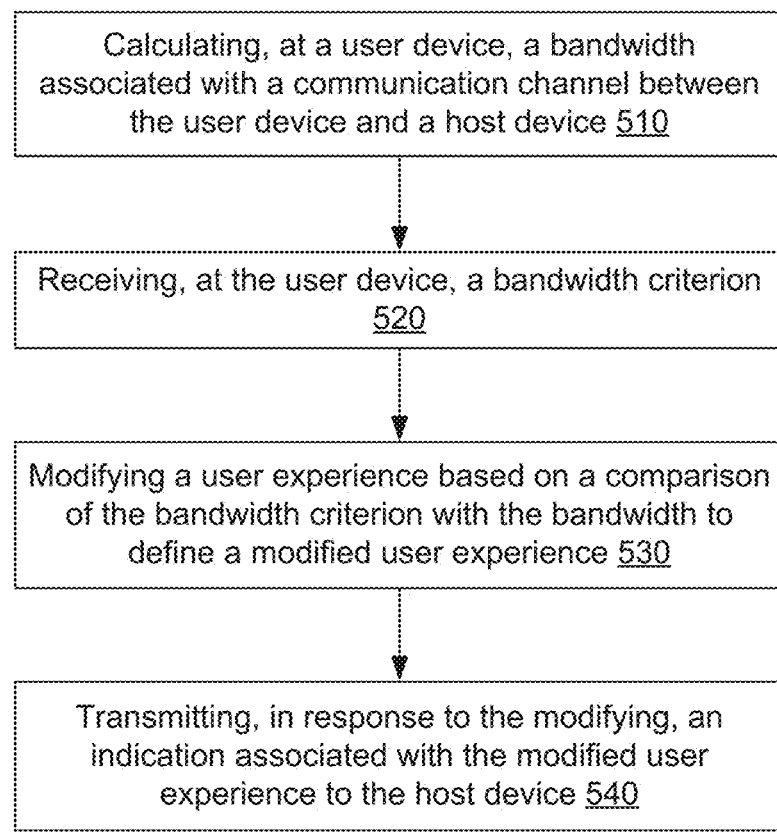
FIG. 5 is a flowchart of a method implemented by a user device, according to an embodiment.

FIG. 5 illustrates a method 500, according to an embodiment. Explained with reference to the user device 412, at 510, a bandwidth associated with communication (e.g., over the connection Na of FIG. 1) between the user device and a host device (e.g., the system 100 of FIG. 1) is calculated by, for example, the bandwidth analysis module 424. In some embodiments, the method 500 further includes transmitting a test request to the host device, and receiving test data in response to the test request. In some embodiments, the method 500 further includes calculating a roundtrip time based on time information associated with the test request and the test data. In such embodiments, the step 510 further includes calculating the bandwidth based on the roundtrip time.

At 520, a bandwidth criterion is received at the user device 412. In some embodiments method 500 further includes transmitting a request for the bandwidth criterion to the host device. In such embodiments, step 520 includes receiving the bandwidth criterion from the host device in response to the transmitting the request for the bandwidth criterion.

At 530, a modified user experience is defined based on a comparison of the bandwidth criterion with the bandwidth. In some embodiments, modifying the user experience includes at least one of modifying an availability of one or more communication channels between the user device and the host device, an availability of one or more communication modes provided by the host device, or an availability of one or more knowledge base articles provided by the host device. In some embodiments, step 530 at least includes modifying the availability of the one or more communication channels. In some embodiments, the one or more communication channels includes at least one of a voice channel, a video channel, a text channel, and/or the like. In some embodiments, step 530 at least includes modifying the availability of the one or more communication modes. In some embodiments, the one or more communication modes includes at least one of image, text, voice, or video. In some embodiments, step 530 at least includes modifying the availability of the one or more knowledge base articles. In some instances, the one or more knowledge base articles are associated with self-service information, and step 530 at least includes modifying self-service options presented to the user.

At 540, an indication associated with the modified user experience is transmitted to the host device. In some embodiments, the indication associated with the modified user experience includes a request for content based on the modified user experience.

In some embodiments, the bandwidth criterion is a bandwidth threshold, and the method 500 further includes receiving a request from the user (e.g., for content, at the user device 412), and selecting, based on (1) the request, (2) the bandwidth threshold, and (3) the bandwidth, content and a form of the content to be requested from the host device. In some embodiments, the method 500 further includes sending a request for the content from the host device. The request for content from the host device including an indication of the content and an indication of the form of the content. In some embodiments, the method 500 further includes receiving the content in response to the request for the content, and presenting the content to the user in response to the request from the user (e.g., on a display associated with the user device 412).

Figure 6:
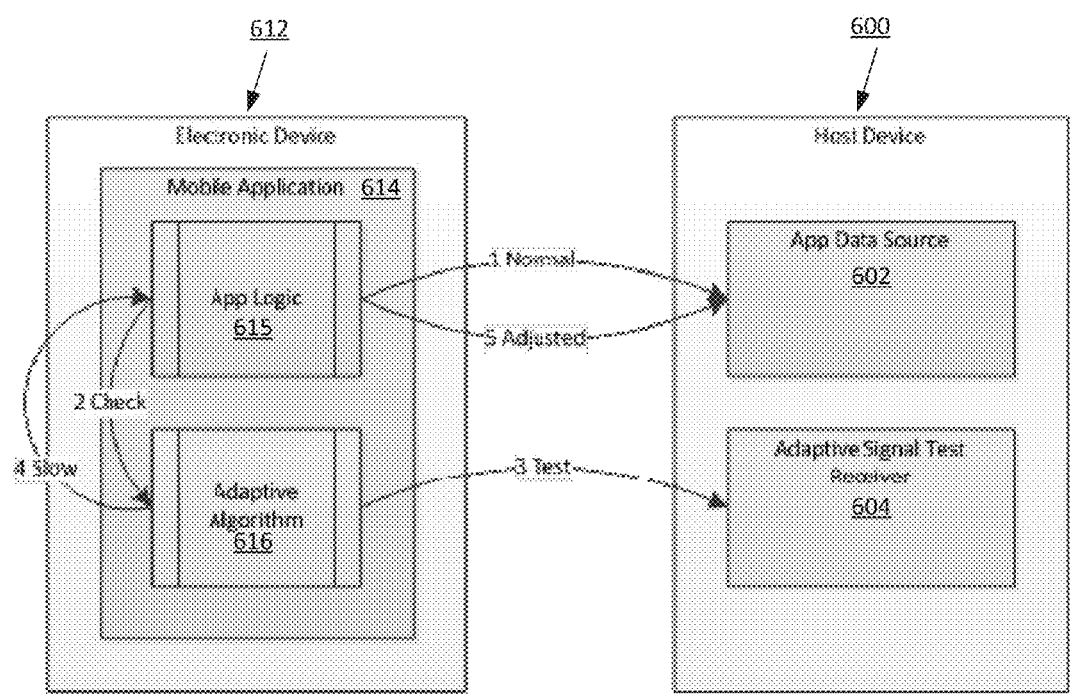
FIG. 6 is an illustration of exemplary interactions between a user devices and an application management system, according to an embodiment.

FIG. 6 illustrates an example of an interaction between an electronic user device 612 and a host device 600. The electronic user device 612 and the host device 600 can be structurally and/or functionally similar to user devices 112a-112n and host device 100 of FIG. 1, respectively. The electronic device 612 includes a mobile application 614 that can be associated with a self-service application, such as, for example, a web browser accessing a web-based application hosted at a service (e.g., application management system 100). The mobile application includes an app logic module 615 and an adaptive algorithm module 616. The app logic module 615 and the adaptive algorithm module 616 can be implemented in hardware such as a memory or a processor (not shown in FIG. 6) and can collectively be functionally similar to the modules 422, 424, 436 and 440 of FIG. 4.

The host device 600 includes an app data source 602 and an adaptive signal test receiver 604. The app data source 602 and the adaptive signal test receiver 604 can be implemented in hardware such as a memory or a processor (not shown in FIG. 6) and can collectively be functionally similar to the modules 122, 124, 128, 132, 136 and 140 of FIG. 2.

In use, the mobile application 614 makes a request for content to the host device 600 that does not specify any modification to the form of the content ("1 Normal"), and receives the requested content without modification (not shown). Periodically, sporadically, and/or based on a request, a check is performed for bandwidth and/or bandwidth criterion ("2 Check") by the app logic. The adaptive algorithm module 616 executes a bandwidth test ("3 Test"), and can indicate a slowing of network conditions to the app logic ("4 Slow"). The next request for content made by the app logic can then include an indication of a modified form of content ("5 Adjusted").

More specifically, the host device 600 can manage sets of signal strength and/or bandwidth threshold settings to command the user device 612 on how to determine modifications and/or adaptations to a self-service application. The user device 612 can send requests to the host device 600 to test network strength and/or bandwidth use. The adaptive signal test receiver 604 can receive the request to test signal strength and bandwidth and can respond to the bandwidth test request with a standard and/or fixed set of data.

The adaptive algorithm module 616 can calculate strength and bandwidth based on time to receive standard data that is returned for the bandwidth test request with a standard and/or fixed set of data. The adaptive algorithm module 616 can compare the calculated strength and bandwidth to one or more thresholds to determine a modification. The user device 612 can send a request to the host device 600 for updated bandwidth threshold settings and the host device 600 can receive the request. The host device 600 can respond to the bandwidth threshold request with a current set of thresholds and/or criteria.

The user device 612 can update threshold level settings and/or criteria based on the response provided by the host device 600. Based on the updated threshold level settings and/or the criteria, the user device 612 can send requests to the host device 600 for data and/or content to be adapted. The host device 600 can then receive requests for data and/or content with a parameter specifying to return normal or modified data.

If the request requests unmodified and/or normal data and/or content, the host device 600 can send unmodified and/or normal data and/or content to the user device 612. If the requests adapted and/or modified data, the host device 600 can adjust the size of data or content per the parameter in the request. Such modified data and/or content can include, for example, a number of account history records, a number of customer service request history records, a number of past messages in a conversation, a multimedia message format (e.g., data compression) used to provide the data and/or content. thumbnails or icons in place of multimedia conversation messages, a number of knowledge base articles and/or the like.

The user device 612 can then display data and/or content to the user based on the received modified data and/or content. Additionally, the user device 612 can adjust the modality options offered to users based on bandwidth test results. Moreover, the user device 612 can adjust or disable other features based on bandwidth test results. For example, the user device can modify and/or disable substantially real-time multimedia chat capabilities (voice, video), modality options offered to users (image messages, voice messages, video messages), automatic content update frequency and/or the like.

Referring to FIGS. 1-6, it will be understood that additional features and variants are within the scope of the embodiments described herein. For example, in some embodiments, the host device 100 can delay delivery of requested content to the user device 112a when network strength and/or bandwidth of the connection Na falls below a predetermined value. In other embodiments, the host device 100 can respond, to a request for content from the user device 112a, with a recommendation to delay delivery of the requested content until network strength and/or bandwidth of the connection Na improves. In such embodiments, the user device 112a can accept or reject the host device's recommendation. In some embodiments, the host device 100 can undertake predictive analysis to identify what content, and in what form, may be requested by the user devices 112a-112n, and can preemptively ensure such content is readily available for transmission, such as by, for example, retrieving the content from a remote database and reformatting the retrieved content.

In some embodiments, the user device 412 can be configured to allocate a portion of the memory 460 and/or the database 470, such as a cache, for storing the content received from the host device 100, and the size of the portion can vary depending on network strength and/or bandwidth. For example, if the download speed of the network connection between the user device 412 and the hose device 100 fails to meet a threshold, the size of the cache can be increased to increase the amount of locally stored content, and to reduce the burden on the network connection. Conversely, when the download speed increases, the size of the cache can be increased, since content can be more readily received without affecting service to the user.

Returning to FIGS. 2 and 4, the processors 110, 410 can be any suitable processing devices configured to run and/or execute a set of instructions or code. For example, each of the processors can be a general purpose processor, a central processing unit (CPU), an accelerated processing unit (APU), an application-specific integrated circuit (ASIC), a field programmable gate array (FPGA) and/or the like. As described above, the processors can be configured to run and/or execute a set of instructions or code stored in the memory associated therewith using a personal computer application, mobile application, an internet web browser, and/or the like.

While shown described herein as a user device (e.g., user devices 112a-112n of FIG. 1) calculating and/or determining a bandwidth and/or signal strength between the user device and an application management system (e.g., application management system 100 of FIG. 1), in other embodiments, the application management system 100 can calculate and/or determine the bandwidth and/or signal strength. In such an embodiment, the application management system can compare the determined bandwidth with one or more criteria. Additionally, in such embodiments, the application management system 100 can automatically adapt content based on the bandwidth without receiving a request for adapted content from the user device.

Additionally, while shown and described herein as the application management system (e.g., application management system 100 of FIG. 1) calculating one or more bandwidth criteria, in other embodiments, a user device (e.g., user devices 112a-112n of FIG. 1) can calculate a bandwidth criterion. In such embodiments, the user device can then use the bandwidth criterion to determine the type and/or form of content to request from and/or the mode to use to communication with the application management system. This allows the user device to determine the criterion without requesting the criterion from the application management system.

In other embodiments, a portion of the functions described as being performed at the user device can be executed at the application management system. In still other embodiments, a portion of the functions described as being performed at the application management system can be performed at the user device.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, and/or files containing higher-level instructions that are executed by a computer using an interpreter. For example, embodiments may be implemented using C, Java, C++, MATLAB or other programming languages and/or other development tools.

The processor(s) can be any processor (e.g., a central processing unit (CPU), an application-specific integrated circuit (ASIC), and/or a field programmable gate array (FPGA)) configured to execute one or more instructions received from, for example, a memory. In some embodiments, the processor(s) can be a Reduced Instruction Set computing (RISC) processor. The processor(s) can be in communication with any of the memory and the network card. In some embodiments, the processor(s) can accordingly send information (e.g., data, instructions and/or network data packets) to and/or receive information from any of the memory and the network card.

The memories disclosed herein can be any memory (e.g., a RAM, a ROM, a hard disk drive, an optical drive, other removable media) configured to store information (e.g., one or more software applications, user account information, media, text, etc.). The memories can include one or more modules performing the functions described herein. In some embodiments, the functions described herein can be performed by any number of modules. For example, in some embodiments, the functions described herein can be performed by a single module.

The memories can also alternatively store one or more resources (e.g., software resources such as drivers, code libraries, etc.) associated with one or more of the modules.

The network card can be a hardware module (e.g., a wired and/or wireless Ethernet card, a cellular network interface card) configured to transmit information (e.g., data packets, cells, etc.) from and receive information at the system 100.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
a user interface module implemented in at least one of a memory or a processing device, the user interface module configured to send a signal to display an interface of a self-service application executed by the processing device to communicate with a host device via a network; and
a bandwidth analysis module operatively coupled to the user interface module, the bandwidth analysis module configured to:
calculate a bandwidth associated with communication with the host device via the network;
transmit a request for a bandwidth criterion to the host device; and
receive, from the host device, the bandwidth criterion, the bandwidth criterion associated with at least one network communication mode used for communication with the host device,
the user interface module configured to reduce or eliminate an availability of the at least one network communication mode to the self-service application when the bandwidth fails to meet the bandwidth criterion.

2. The apparatus of claim 1, wherein the user interface module is configured to modify the interface of the self-service application by reducing or eliminating availability of one or more knowledge base articles to the self-service application when the bandwidth fails to meet the bandwidth criterion, the knowledge base articles associated with self-service information provided to the user via the self-service application.

3. The apparatus of claim 1, wherein the at least one network communication mode includes at least one of images, text, voice, or video.

4. The apparatus of claim 1, wherein the at least one communication mode includes at least one of a voice communication channel or a video communication channel.

5. The apparatus of claim 1, wherein the user interface module is configured to receive a request from the user, the bandwidth analysis module further configured to:
select, based on (1) the request from the user, (2) the bandwidth criterion, and (3) the bandwidth, content and form of the content to be requested from the host device to define selected content;
send a request for the selected content to the host device, the request for the selected content including an indication of the content and an indication of the form of the content; and
receive, in response to the request for the selected content, the selected content,
the user interface module further configured to present the selected content to the user in response to the request from the user.

6. A method, comprising:
calculating, at a user device, a bandwidth associated with communication between the user device and a host device;
transmitting a request for a bandwidth criterion to the host device;
receiving, at the user device, the bandwidth criterion;
modifying a user experience based on a comparison of the bandwidth criterion with the bandwidth to define a modified user experience, the modifying including modifying at least one of:
    an availability of one or more communication channels between the user device and the host device;
    an availability of one or more communication modalities provided by the host device; or
    an availability of one or more knowledge base articles provided by the host device; and
transmitting, in response to the modifying, an indication associated with the modified user experience to the host device.

7. The method of claim 6, further comprising:
transmitting a test request to the host device;
receiving test data in response to the test request; and
calculating a roundtrip time based on time information associated with the test request and the test data,
the calculating the bandwidth including calculating the bandwidth based on the roundtrip time.

8. The method of claim 6, wherein the modifying the user experience includes modifying the availability of the one or more communication channels, the one or more communication channels including at least one of a voice channel or a video channel.

9. The method of claim 6, wherein the modifying the user experience includes modifying the availability of the one or more communication modalities, the one or more communication modalities including at least one of image, text, voice, or video.

10. The method of claim 6, wherein the modifying the user experience includes modifying the availability of the one or more knowledge base articles, the one or more knowledge base articles associated with self-service information, the modifying the availability of the one or more knowledge base articles including modifying self-service options presented to the user.

11. The method of claim 6, wherein the bandwidth criterion is a bandwidth threshold, the method further comprising:
receiving a request from the user;
selecting, based on (1) the request, (2) the bandwidth threshold, and (3) the bandwidth, content and a form of the content to be requested from the host device;
sending a request for the content from the host device, the request for content from the host device including an indication of the content and an indication of the form of the content;
receiving the content in response to the request for the content; and
presenting the content to the user in response to the request from the user.

12. The method of claim 6, wherein the indication associated with the modified user experience includes a request for content based on the modified user experience.

13. A method, comprising:
receiving, from a user device and at a host device, a request for a bandwidth criterion;
transmitting, in response to the receiving of the request for the bandwidth criterion at the host device, the bandwidth criterion to the user device;
receiving, at the host device after the transmitting, a request for content including an indication of content and an indication of a form of the content;
selecting content based on the indication of the content and the indication of the form of the content to define selected content, the selecting including selecting at least one of:
    a number of knowledge base articles to include in the selected content; or
    a number of representations of previous requests for content made by the user device to include in the selected content; and
transmitting, to the user device, the selected content in response to the request for content.

14. The method of claim 13, wherein the request for the bandwidth criterion is a first request, the method further comprising:
receiving an updated bandwidth criterion after receiving the request for the first bandwidth criterion;
receiving, from the user device and after receiving the updated bandwidth criterion, a second request for a bandwidth criterion;
transmitting, to the user device and in response to the receiving the second request, the updated bandwidth criterion.

15. The method of claim 13, wherein the selecting the content includes selecting the number of knowledge base articles to include in the selected content, the knowledge base articles associated with self-service information.

16. The method of claim 13, wherein the selecting the content includes selecting the number of representations of previous requests for content made by the user device to include in the selected content.

17. The method of claim 13, wherein the request for content is a request for first content, the method further comprising:
receiving a request for second content, the request for second content not including an indication of a form of the second content; and
transmitting the second content in a default form in response to the request for second content.

18. The method of claim 13, wherein the request for content is a request for first content, the method further comprising:
receiving a request for second content, the request for second content including an indication of default second content and of a default form of the second content; and
transmitting the default second content in the default form of the second content in response to the request for second content.

* * * * *